(12) United States Patent
Culbertson

(10) Patent No.: US 7,941,432 B2
(45) Date of Patent: May 10, 2011

(54) PROVIDING NOTICE VIA THE INTERNET

(75) Inventor: K. E. Crispin Culbertson, Brown Summit, NC (US)

(73) Assignee: GlobalNotice, Inc., Greensboro, NC (US)

( * ) Notice: Subject to any disclaimer, the term of this patent is extended or adjusted under 35 U.S.C. 154(b) by 0 days.

(21) Appl. No.: 12/562,768

(22) Filed: Sep. 18, 2009

(65) Prior Publication Data

US 2010/0094929 A1    Apr. 15, 2010

Related U.S. Application Data

(63) Continuation-in-part of application No. 11/986,562, filed on Nov. 21, 2007.

(60) Provisional application No. 60/860,293, filed on Nov. 21, 2006, provisional application No. 60/879,835, filed on Jan. 11, 2007, provisional application No. 60/901,623, filed on Feb. 13, 2007.

(51) Int. Cl.
*G06F 17/30* (2006.01)

(52) U.S. Cl. .......................................... 707/736; 707/804

(58) Field of Classification Search .................. None
See application file for complete search history.

(56) References Cited

U.S. PATENT DOCUMENTS

| | | | |
|---|---|---|---|
| 6,883,003 B2 * | 4/2005 | Nagahara | 1/1 |
| 7,548,930 B2 * | 6/2009 | Kobza et al. | 1/1 |
| 2001/0056407 A1 * | 12/2001 | Williams | 705/52 |
| 2003/0069850 A1 | 4/2003 | Ogilvie | |
| 2003/0074354 A1 * | 4/2003 | Lee et al. | 707/8 |
| 2005/0240623 A1 | 10/2005 | Kobza et al. | |
| 2006/0080121 A1 * | 4/2006 | Chiang | 705/1 |

OTHER PUBLICATIONS www.notice.com, published Feb. 10, 2003, 1 page.

* cited by examiner

*Primary Examiner* — Charles Rones
*Assistant Examiner* — Yuk Ting Choi
(74) *Attorney, Agent, or Firm* — Patterson Thuente Christensen Pedersen, P.A.

(57) ABSTRACT

A system for posting a public notice on the Internet for a legal jurisdiction. The system includes a forum server, client computer, and the Internet. The forum server stores data and information regarding public notices in the jurisdiction, and supports a website that provides notice-related services such as posting, searching, monitoring, and other legal services.

20 Claims, 15 Drawing Sheets

PROVIDING NOTICE VIA THE INTERNET

RELATED APPLICATION

This application is a continuation-in-part of application Ser. No. 11/986,562 filed Nov. 21, 2007, which claims the benefit of U.S. Provisional Application No. 60/860,293 filed Nov. 21, 2006, U.S. Provisional Application No. 60/879,835 filed Jan. 11, 2007, and U.S. Provisional Application No. 60/901,623 filed Feb. 13, 2007, which are incorporated herein in their entirety by reference.

FIELD OF THE INVENTION

The invention relates generally to systems and methods for providing public and non-public notice through nontraditional means. More specifically, this invention relates to systems and methods for providing legal and other public notice using the Internet.

BACKGROUND OF THE INVENTION

As most lawyers and people know, the law requires notice before certain types of legal actions can proceed. The most ready example of the need for public notice, of course, would be notice by publication in serving a lawsuit where the defendant cannot be found for personal service of the summons. Currently, notice by publication is accomplished by publication in a newspaper. Given the well publicized disintegration of the paper newspaper industry currently taking place (which is in turn due partly to the fact that only 19% of persons under the age of 35 still read a newspaper at least once per week), this form of notice no longer serves the public policy behind the enabling statutes (i.e., the widest possible dissemination of the notice to the public). Thus, this traditional means of public notice no longer serves its legal function. Additionally, the costs incurred in the use of traditional methods can be much greater than those associated with on-line notice postings. Further, the security and archival options of traditional notice methods are limited. Traditional methods of providing notice also suffer from limited coverage due to the fact that notice is constrained to the available newspaper circulation area. Finally, traditional methods of notice are constrained by delivery schedules and cycles of newspaper vendors and delivery personnel along with the hours of operation of many courthouses.

Using the Internet to provide notice services overcomes only some of the shortcomings of traditional print publication. Currently, the only forms of Internet-based public notice that exist are what can be termed "republication" notices. For example, newspapers often publish an online version of their printed notices on a website. Other organizations have attempted to provide limited, secondary publication public notice services via the Internet, but have failed to create a centralized forum for all state-encompassed jurisdictions and/or a forum of original publication for public notice within a jurisdiction that is both government sanctioned (or sanctioned by some other useful body) and quality controlled, or not, as the jurisdiction and case might require.

As such, a need exists for a cost-effective, quality-controlled forum for providing centralized, original-jurisdiction legal and other public notice within a legal jurisdiction.

SUMMARY OF THE INVENTION

The invention substantially meets the aforementioned needs of the industry by providing a unique way of achieving legal and other notice which is first and foremost consolidated, and also more thorough, wide-reaching, and inexpensive than that which could be achieved via notice by publication at the courthouse or in a newspaper, and thereby creates a certainty of increasing the dissemination of the notice to the intended party or parties. Further, various embodiments of the invention overcome the limitations presented above by allowing economical public notice across all jurisdictions, at all times.

One embodiment of the present invention is a system for posting a public notice on the Internet. The system may include a notice database server, notice application server and an interactive voice response server. The servers may be configured to operate on a local area network (LAN) or wide area network (WAN). In various embodiments, additional servers may be utilized in load-balancing or cluster configurations in order to handle increased load and to maintain system performance as the number of users increase. In this way, system users may access the system utilizing network-capable devices or via voice-enabled devices.

In various embodiments, the notice database server stores data and information regarding public notices in various jurisdictions including federal, state and county. The notice application server supports a notice website that provides notice-related services such as posting, searching, monitoring, and others. Further, the notice application server may serve custom Uniform Resource Locators (URL) for specific jurisdictions in order to merge with existing web offerings of that jurisdiction. Further the custom URLs may provide an initial level of filtering for notices and services offered.

Another embodiment of the present invention is a method of posting a public notice on a government-sanctioned website. Steps include accessing a court's case database, locating a court filing that requires public notice in the database, transferring the information required for public notice to an offsite server, and making the public notice available to users of the Internet. Another method for obtaining the necessary court filing information to post to the government-sanctioned website is to utilize a notice application/web server to directly connect to a court's case database and query notice information in order to dynamically generate near real-time updates to the notice pages provided by the notice website and display updated notice-related information.

Another embodiment of the present invention is a method of searching for notice information utilizing the notice website. Steps include choosing key search terms, searching the notice website for notices using key terms, providing search results relevant to the users notice query. Searching the notice website may include searching the notice archives for notices that have elapsed. Further, in certain embodiments the end-user performing the search may be notified later as additional notices are added to the notice database.

In other embodiments, the notice application server and notice database are able to store and provide notice relating to additional businesses that frequently utilize notice mechanisms. In this way, the notice application/web server may provide key business information such as the address and current registered agent of a selected company.

The above summary of the various embodiments of the invention is not intended to describe each illustrated embodiment or every implementation of the invention.

BRIEF DESCRIPTION OF THE DRAWINGS

The invention may be more completely understood in consideration of the following detailed description of various embodiments of the invention in connection with the accompanying drawings, in which.

Figure 1:
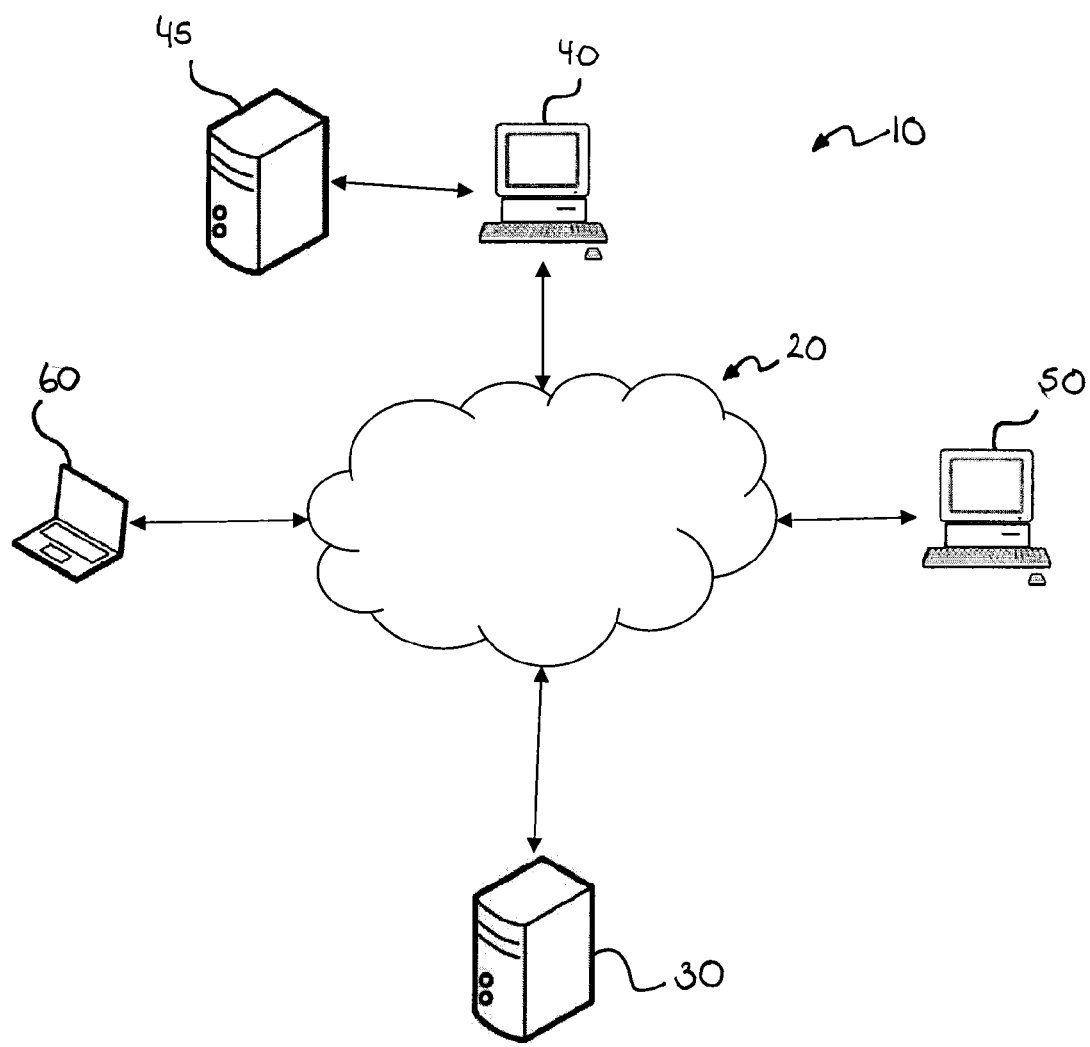
FIG. 1 is a system diagram of one embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Referring to FIG. 1, one embodiment of a system for posting a public notice on the Internet is presented The system 10 may include the Internet 20, a notice server 30, a administrative computer 40, a administrative server 45, and client computers 50 and 60.

The Internet 20 is utilized to provide interconnectivity between the notice server 30, administrative computer 40 and client computers 50 and 60. In this way, the system 10 utilizes the Internet 20 as a platform to connect otherwise disconnected computers and computer networks and allows network capable devices to send and receive information and connect to services made available.

The notice server 30 may include a database component and an application/web server component. Thus, in various embodiments the notice server is able to store data related to public notices and provide services related to the posting, searching, and monitoring of public and non-public notices over a network.

The court administrative computer 40 may be a computer located at an administrative office of a court or other government office or department. The administrative computer 40 may be a "dumb" terminal connected to the administrative server 45. In other embodiments, the administrative computer 40 is a personal computer (PC) running software enabling it to connect to the administrative server 45 such as remote desktop, terminal, or virtualization software. In other embodiments, administrative computer 40 is a portable computing device such as a laptop, netbook, ultra mobile PC (UMPC), or other computer capable of communication over a network.

In various embodiments, administrative server 45 contains digital public and non-public records of court filings and other legal information. In other embodiments, the administrative server 45 may include other documents relevant to the functioning of a court such as scheduling information, contact information and payroll.

Client computers 50 and 60 may be personal desktop computers, personal laptops, netbooks, servers, UMPCs, smartphones such as the iPhone® from Apple® or Pre® from Palm® or other devices capable of communication over a network. The client computers 50 and 60 may utilize their network connectivity to contact notice server 30 and retrieve information related to public and private notice. Further the client computers 50 and 60 may utilize their network connectivity to contact notice server 30 and submit a public notice.

Figure 2:
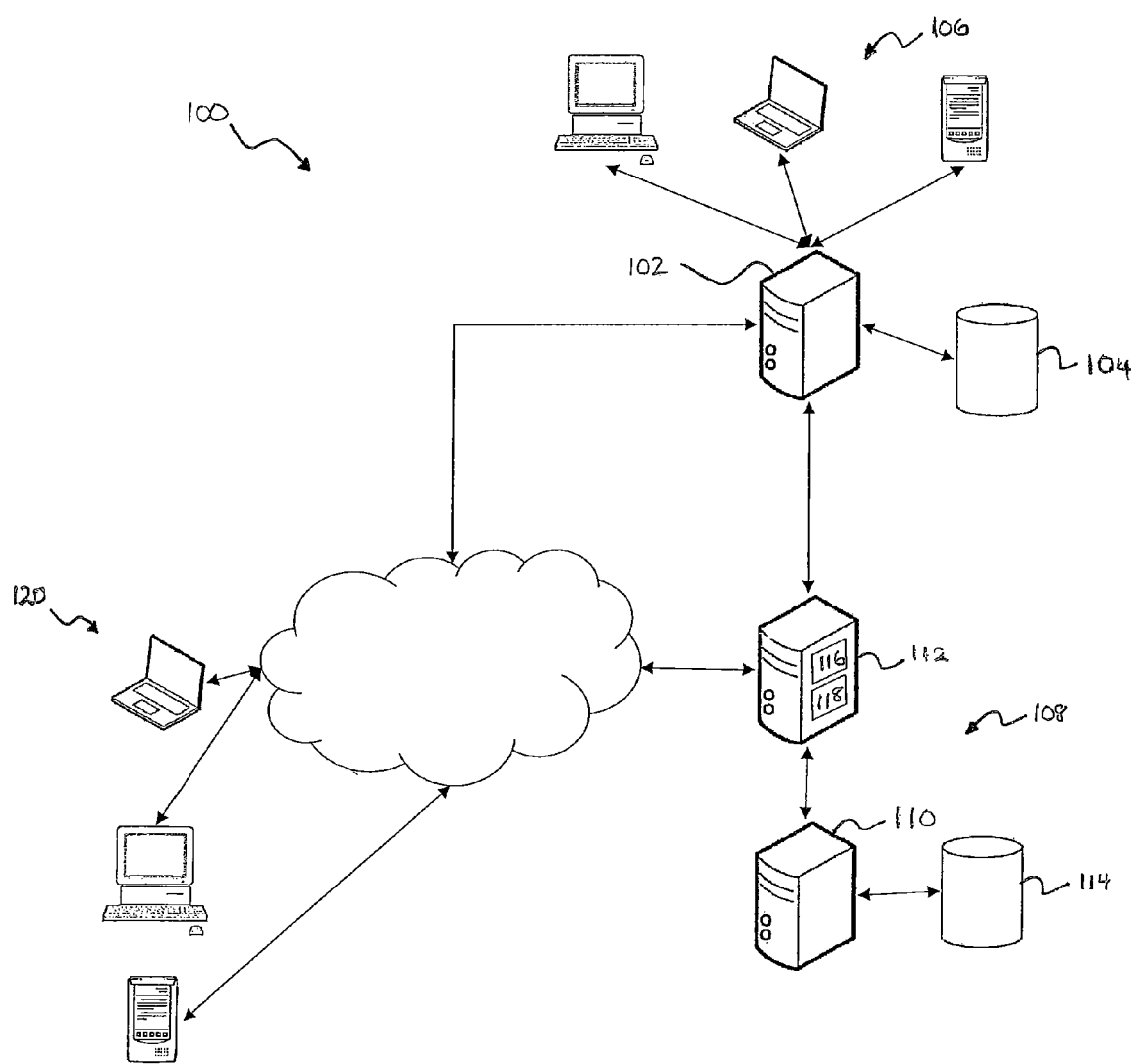
FIG. 2 is a system diagram of another embodiment of the present invention.
Figure 3:
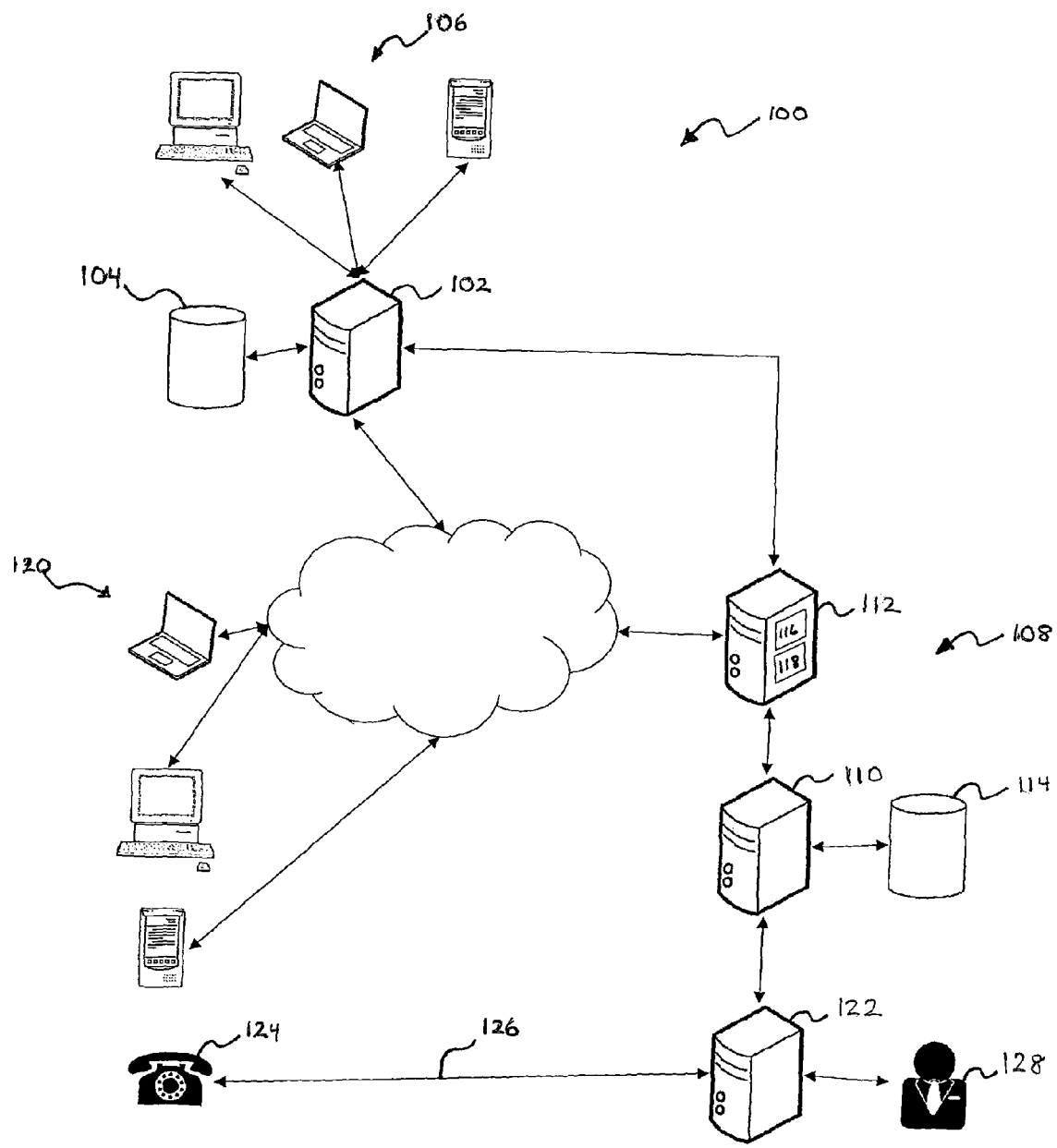
FIG. 3 is a system diagram of another embodiment of the present invention.
Figure 4A:
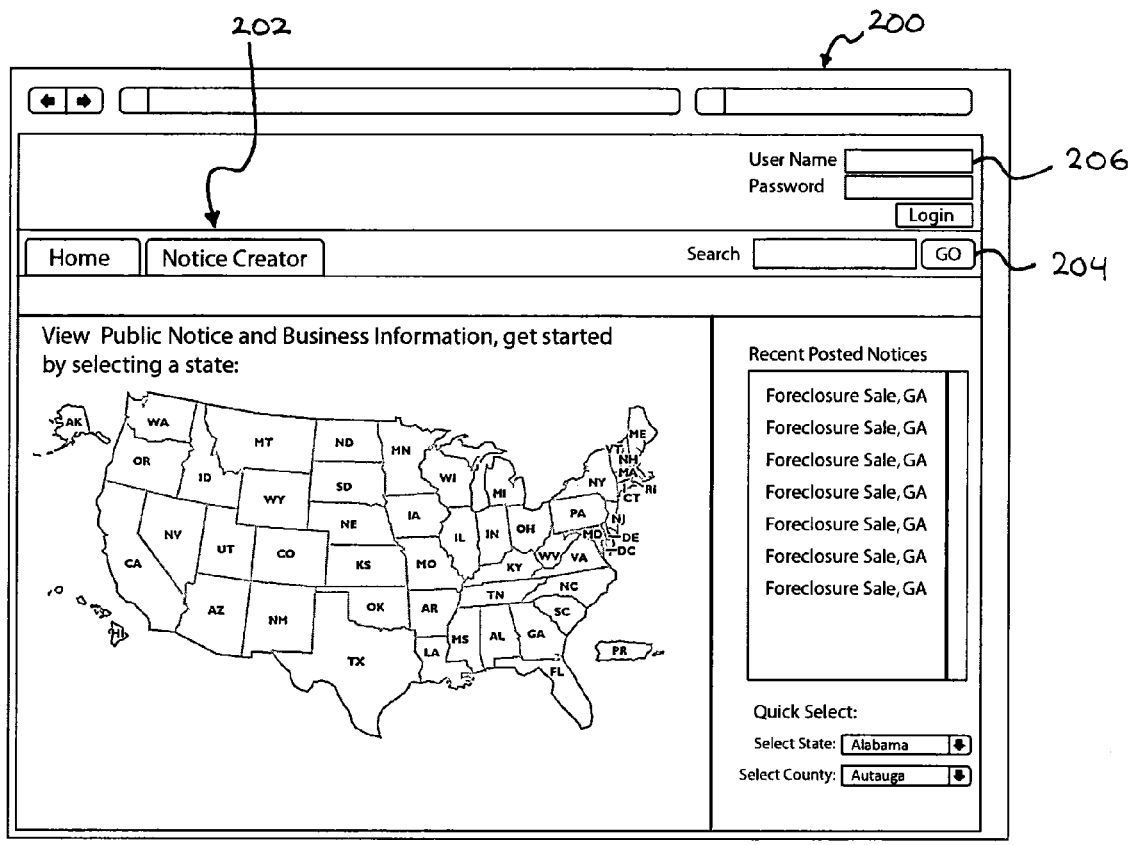
FIGS. 4A-4G are diagrams depicting the user interface of an Internet notice posting system according to various embodiments.
Figure 4B:
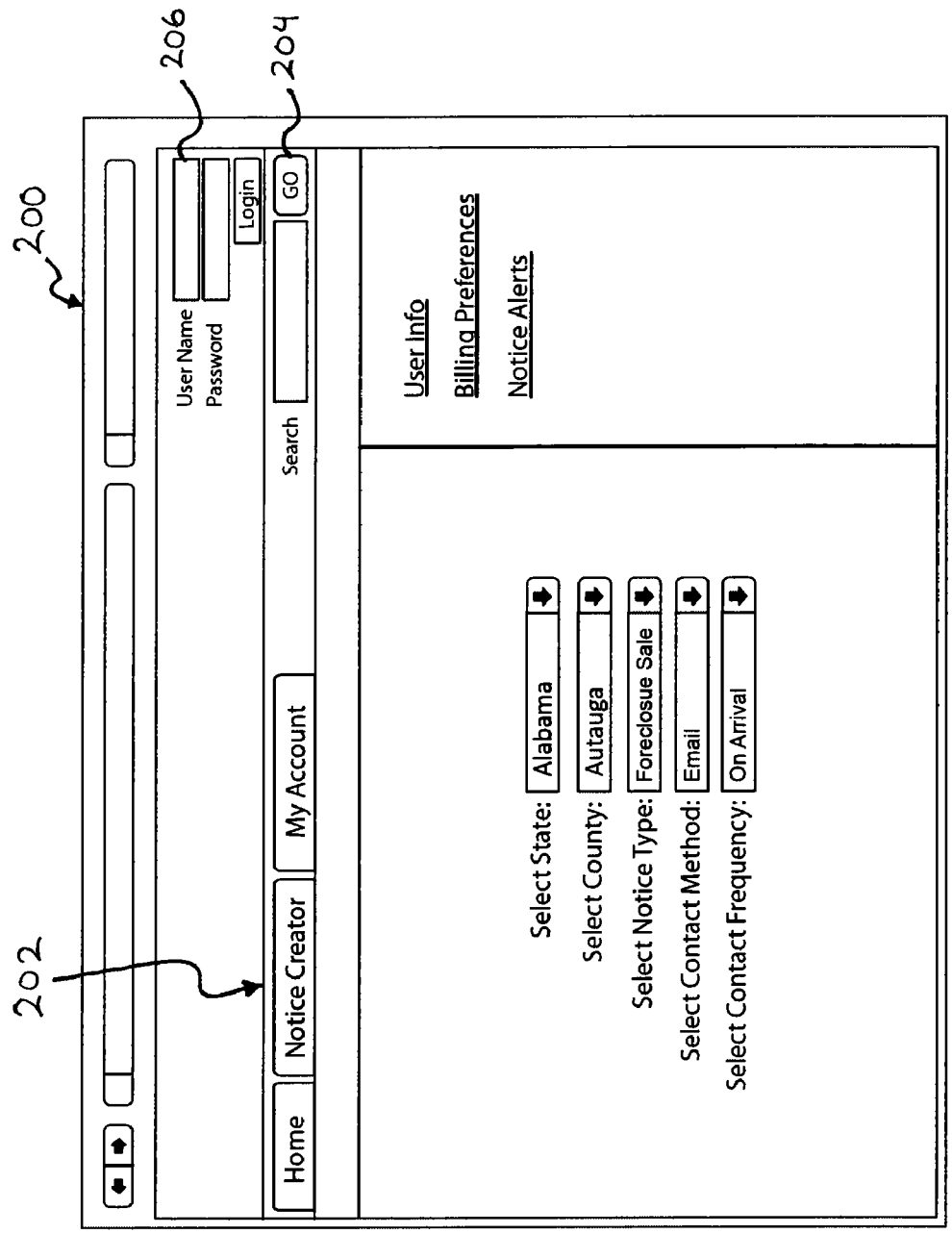
Figure 4C:
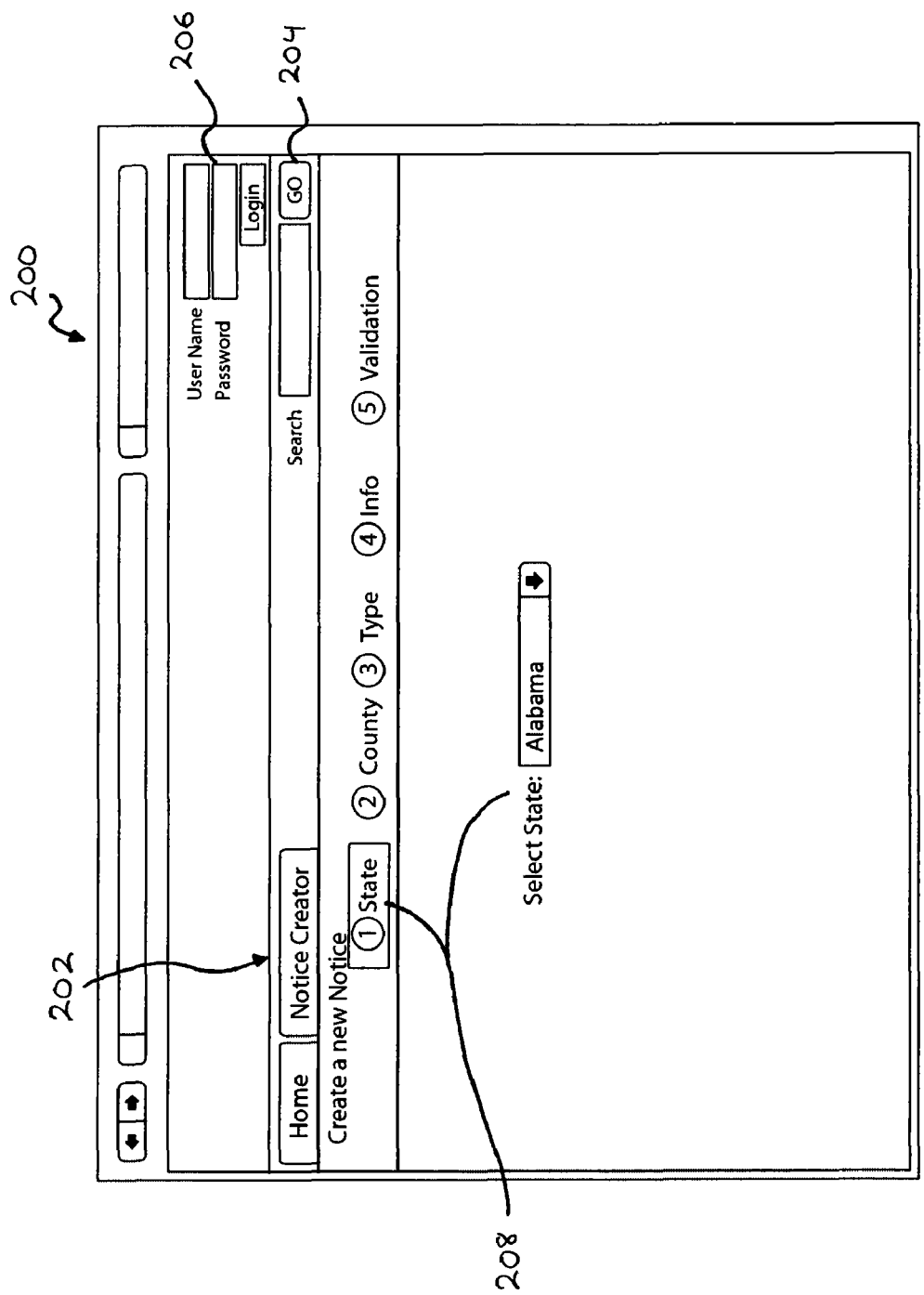
Figure 4D:
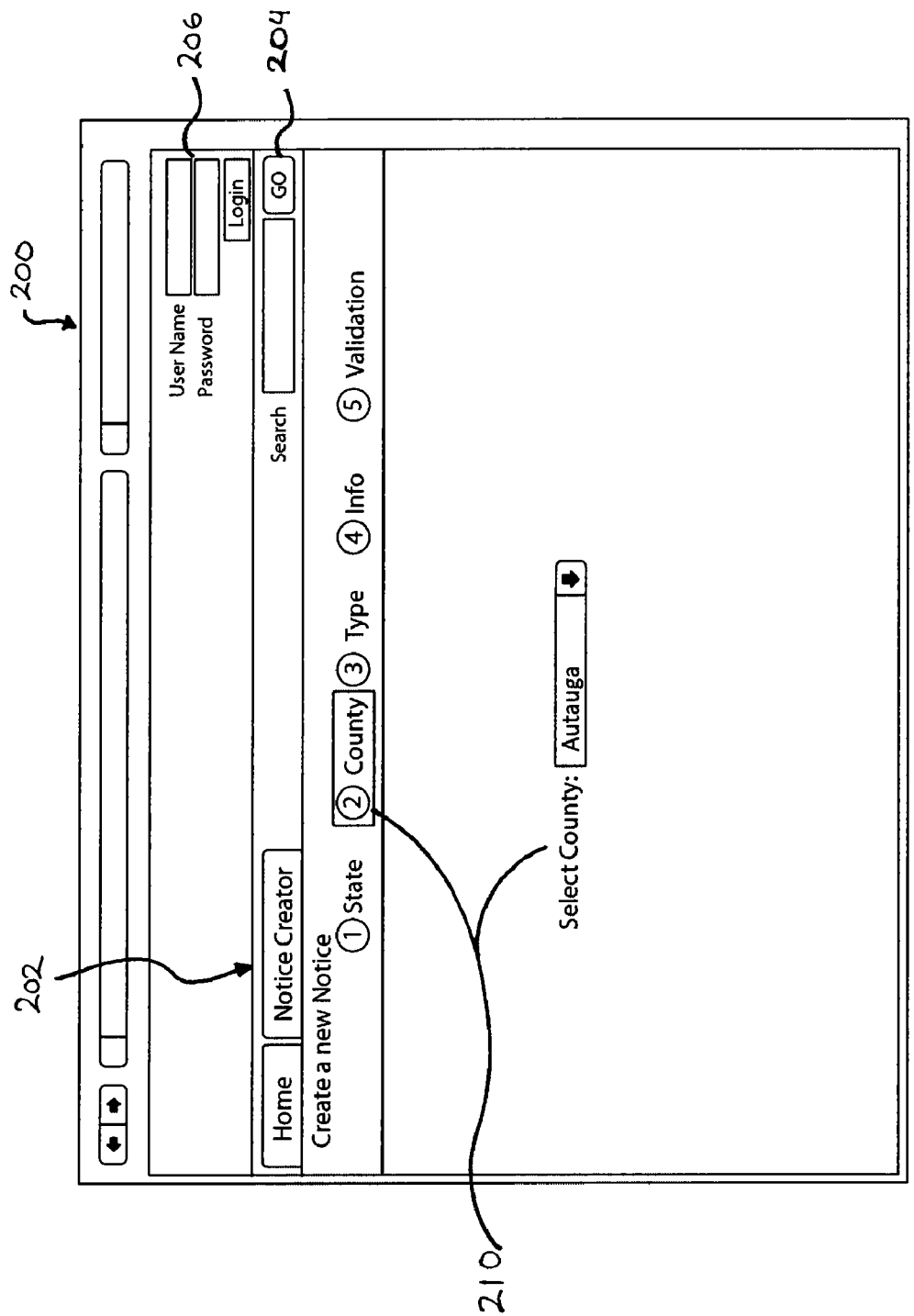
Figure 4E:
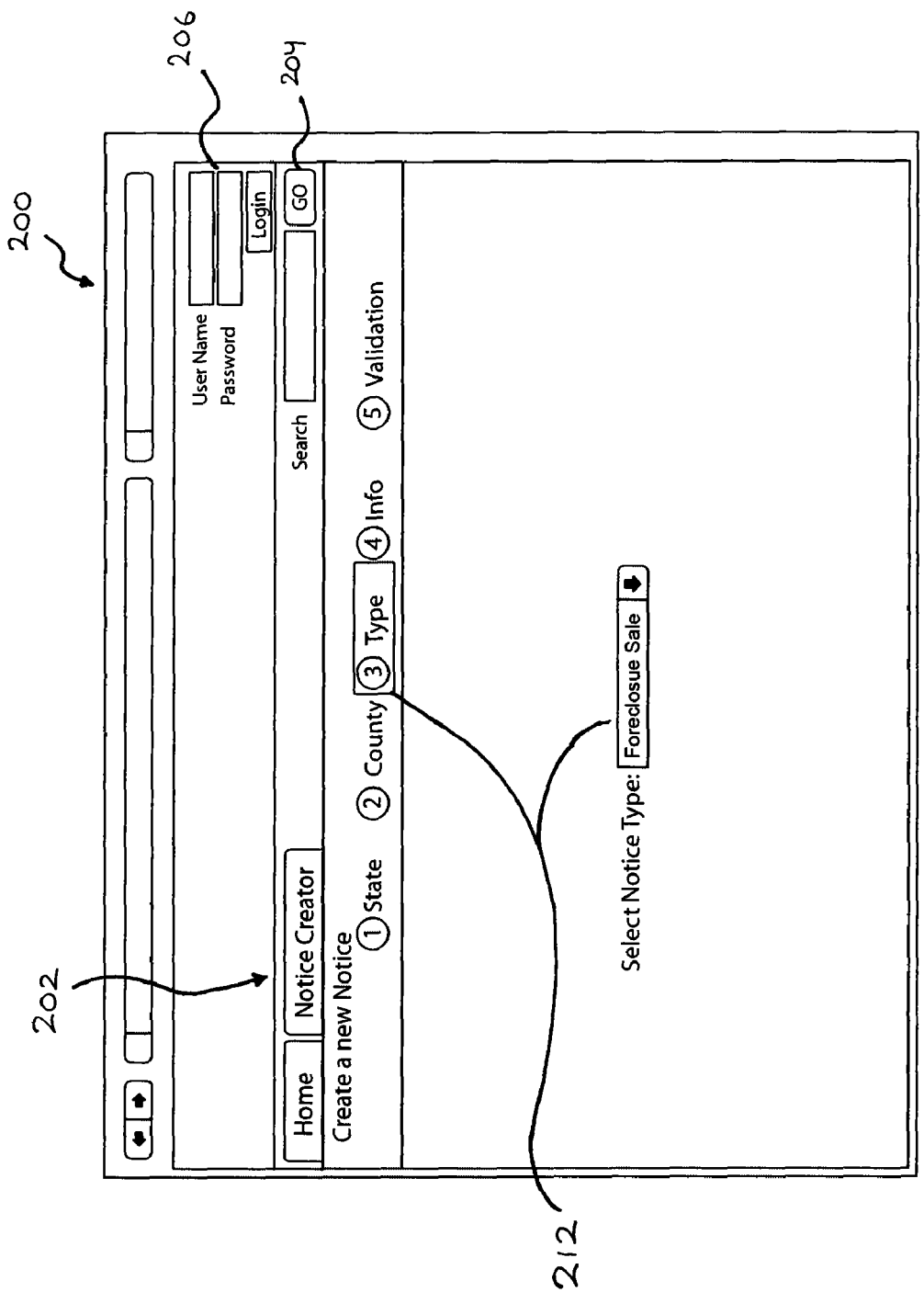
Figure 4F:
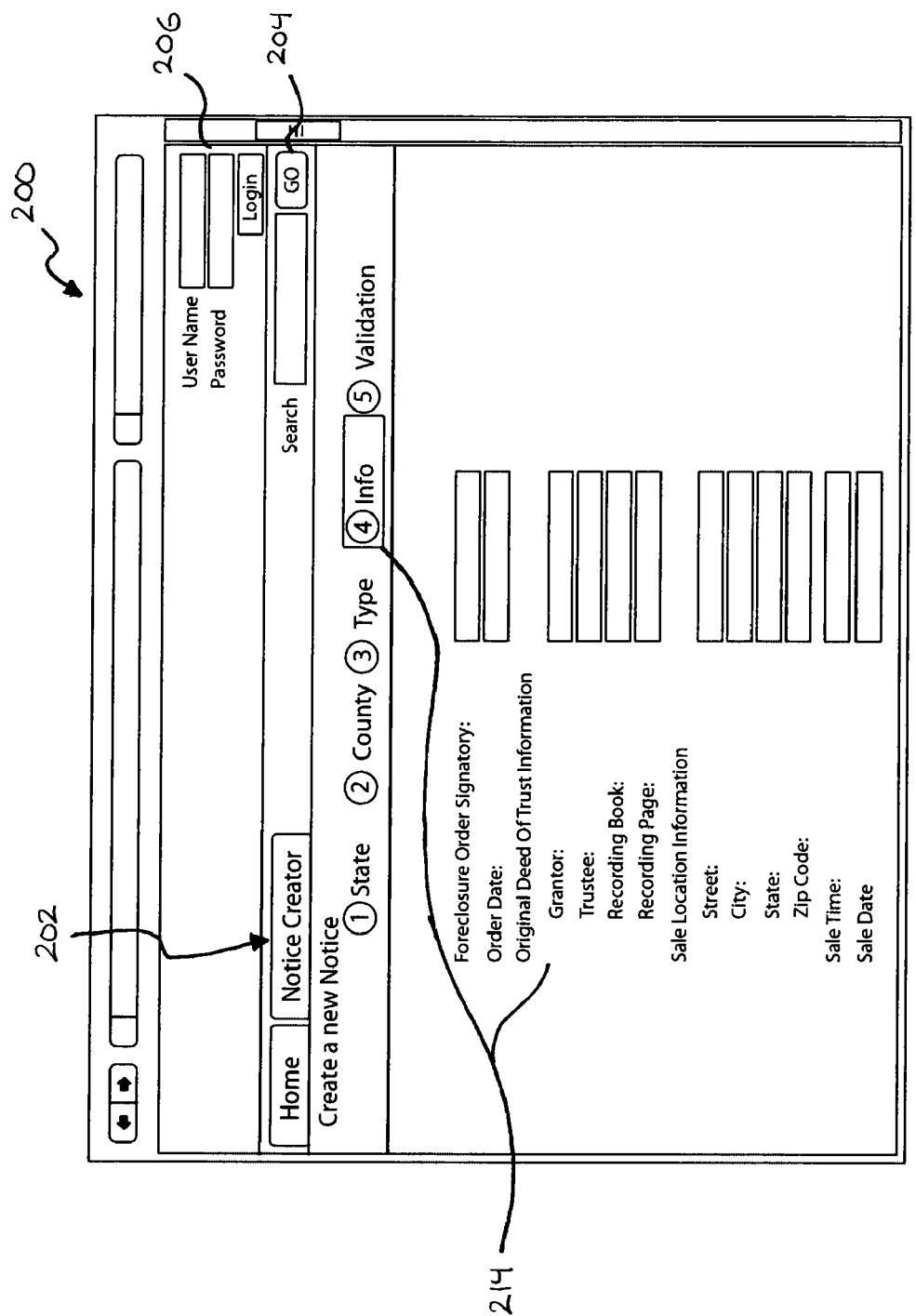
Figure 4G:
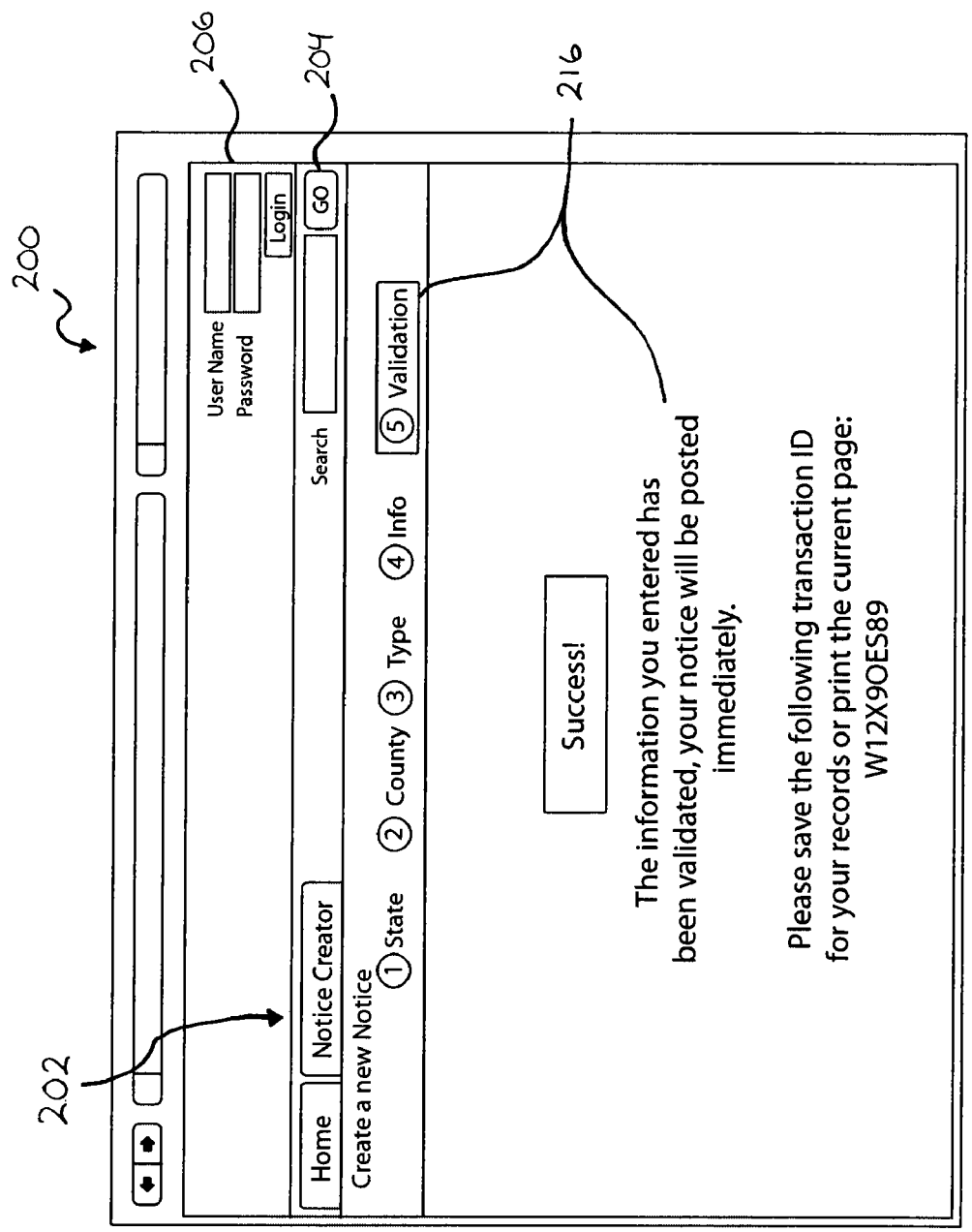

Now referring to FIGS. 2 and 3, alternative embodiments of a system for posting a public notice on the Internet are presented. In various embodiments, the apparatuses, methods and systems of the present invention work in conjunction with the respective state's Administrative Office of the Courts (AOC). System 100 includes AOC enterprise servers 102. The AOC enterprise servers may include database servers, web servers, application servers, voice-over-ip servers or other servers that help maintain the normal operations of the Clerk of the Court. In various embodiments, the AOC enterprise servers 102 include a database server having a case system database 104. The AOC enterprise servers may connect to a plurality of client computers 106 within the Clerk of Court network. The Clerk of Court network may be a Local Area Network (LAN) using Internet routing protocols such as TCP/IP. In other embodiments, the plurality of client computers 106 may utilize a Virtual Private Network (VPN) to connect to the AOC enterprise servers 102.

In various embodiments, system 100 includes an Internet notice posting system 108. The Internet notice posting system 108 may include a notice database server 110 and a notice application server 112. The notice database server 110 may include a notice database 114 for storing notice data. The notice database server 110 may utilize software databases such as MySQL®, Microsoft® SQLServer®, Oracle®, Postgres, Ingres® or others to store the notice information. Further, the notice database server 110 may connect to the notice application server 112 directly or the notice database server 110 and notice application server 112 may reside on the same hardware.

The notice application server 112 may host a website and related services enabling client connection for the posting of notices on the Internet. The notice application server 112 may utilize software such as Apache® Webserver, Microsoft IIS, Oracle BEA, IBM® Websphere® or others in providing notice application services and website. The website provided by the notice application server may provide a user interface coded in HTML, XHTML and may utilize Cascading Stylesheets (CSS) and Javascript® for further refinement of the website user interface. In other embodiments the application server provides a website utilizing a Model View Controller (MVC) architecture to increase customization and flexibility. Further, the notice application server may allow for custom uniform resource locators (URL) and subdomains for the customization of the Internet notice posting system 108 services. For example, if the government of Florida was interested in utilizing the Internet notice posting system 108, a custom URL such as flnotice.com could be created to allow for a customized user interface that better matches Florida governmental websites. Further, the notice application server 112 may be configured to run software applications developed in a variety of programming languages including JAVA® .NET, C, C++, C#, Perl®, Ruby®, Grails®, Python® and others. In certain embodiments, the notice application server 112 contains the notice formatting system (NFS) 116 and the posting validation system (PVS) 118. In these embodiments the notice application server 112 is able to process information submitted via a variety of input sources such as a hosted web site, a web service, connected database servers, and file transfers over protocols such as FTP, SCP and SFTP.

In certain embodiments, notice database server 110 and notice application server 112 are connected via a LAN. In other embodiments the notice database server 110 and notice application server 112 are connected via a distributed network utilizing various architectures such as Client-Server, N-Tier, P2P or cluster. Further, the notice database server 110 and notice application server 112 may be standard desktop computers or may utilize high-end server hardware. A person having skill in the art will appreciate that the notice database server 110 and notice application server 112 will utilize hardware that is most appropriate for its load and performance requirements whether that be a the mini-ITX form factor, Extended ATX, blade or other configuration. Further, the servers may utilize Intel or AMD processors, Double Data Rate (DDR) memory, Error Correcting memory (ECC), rotational or Solid State Disk (SSD) arrays and other hardware to ensure optimum performance and reliability in operation and storing of notice data. Further, the notice database server 110 and notice application server 112 may utilize enterprise-class software such as Linux®, Unix® or Windows® Server operating systems. Additional notice database servers 110 and notice application servers 112 may be utilized in load-balancing or cluster configurations in order to handle increased load and to maintain system performance as the number of requests to the notice database server 110 and notice application server 112 increase. Also, in certain embodiments the notice database server 110 and notice application server 112 utilize the same underlying hardware.

The AOC enterprise servers 102 may connect to the Internet notice posting system 108. In various embodiments the AOC enterprise servers will connect to the notice database server 110 directly. The AOC enterprise servers 102 may utilize a TCP/IP link to the notice database servers 110. In other embodiments, the notice database servers 110 or notice application servers 112 utilize a VPN connection to gain secure access to AOC enterprise servers 102 that may be protected by a firewall (not shown). The AOC enterprise servers may also connect to the notice database server 110 and transfer information utilizing file transfer protocol (FTP). Further, in various embodiments information is sent to the notice database server 110 utilizing XML, CSV or other file transfer protocols and formats. In other embodiments, the AOC enterprise servers 102 may connect to a notice application server 112 utilizing a web service. The web service may utilize TCP/IP including HTTP and implement SOAP, or may utilize a RESTful architecture for queries and response. Further, the web service may be secured by utilizing secure web service technologies such as XML encryption, XML signatures, Secure Socket Layer (SSL), Transport Layer Security (TLS), Hypertext Transfer Protocol Secure (HTTPS) or HTTP Authentication. In this embodiment, the AOC enterprise server 102 would format a message containing notice information and send it to the notice application server 112 which would process the message and send the underlying information to the notice database server 110 for storage in the notice database 114.

In various embodiments, the AOC enterprise servers 102 may flag records for immediate posting to the Internet notice posting system 108. The records may be flagged by an AOC employee that creates the notice record within the AOC system. In these embodiments, the AOC may utilize a notice posting system toolbar, desktop widget or software application that will push the notice data to the Internet notice posting system 108. In other embodiments, the AOC will add a data element to the AOC enterprise servers 102. Thus, AOC employees will flag the data element when generated notice records in the AOC enterprise servers 102 should be transmitted to the Internet notice posting system 108. In one embodiment, the Internet posting system 108 will query the AOC enterprise servers 102 and pull the notice information in flagged records. In this way, the Internet notice posting system 108 may obtain notice posting system information from various jurisdiction's AOC in near real-time and provide the most relevant and up-to-date notice information.

System 100 also includes a plurality of client computers 120. The client computers 120 may utilize operating system software such as Microsoft Windows XP®, Vista®, and various distributions of Linux or Unix. Further, client computers 120 may utilize various programs to connect to remote machines over the network. For example, a client may utilize browser software such as Mozilla Firefox®, Windows Explorer® or Apple Safari® to contact external servers and make requests for information. In other embodiments client computers may utilize programs coded in Adobe Flex® or similar to allow for network-enabled desktop applications. The client computers 120 may utilize TCP/IP including HTTP for network communication. Finally, in various embodiments, client computers 120 may utilize a variety of programs supporting more secure transfer protocols such as HTTPS, SSH File Transfer Protocol (SFTP) or Secure Copy (SCP). In this way, the plurality of client computers 120 may contact the Internet notice posting system 108 in order to post new Internet notices and notice information.

In another embodiment, the Internet notice posting system 108 includes an Interactive Voice Response (IVR) server 122. The IVR server 122 may be connected to the notice application server 112. The IVR server 122 is able to interpret voice and keypad inputs from voice clients 124 for further processing and communication. The IVR server 122 may utilize enterprise-class software such as Linux, Unix or Windows Server operating systems. In addition, the IVR server 122 may utilize IVR software such as Convergys Intervoice, Holly Voice Platform, Nortel Media Processing Server, Genesys Voice Platform, WebSphere Voice Response or others in providing voice and keypad services. Additional software, such as database programs including MySQL, Microsoft SQLServer, Oracle, Postgres, Ingres or others may be utilized to store voice and keypad information for later retrieval. Further, the IVR server 122 may be configured to run other software applications developed in a variety of programming languages including JAVA, .NET, C, C++, C#, Perl, Ruby, Grails, VoiceXML, Call Control XML, MRCP, SIP and others. In order to handle additional load, additional servers may be utilized in load-balancing or cluster configurations to maintain system performance. Further, the IVR server 122 may utilize a telephony board or similar telephone hardware and software as provided by Dialogic, Ai-Logix, Natural Micro Systems, Music Telecom and others to process phone calls. In this way, the IVR server 122 is able to process requests from voice clients 124 connecting over telephone lines 126, analyze and forward the information to the notice application server 112 and notice database server 110. In addition, in various embodiments, customer service representatives 128 may be connected to the IVR server 122 in order to handle customer requests and issues.

Now referring to FIGS. 4A-4G embodiments of a user interface 150 to the Internet posting system 108 are provided. As mentioned, the Internet notice posting system 108 may contain a notice application server 112 that provides a user interface 200. The user interface 200 may contain several tabs 202 to facilitate navigation. Further the user interface 200 may contain a search feature 204 to allow for querying capability of the Internet notice posting system 108. Further, in various embodiments the user interface 200 may contain a user login or register feature 206 where end-users may register user accounts and sign up for recurring communications regarding notices that they are interested in. For example, a user could register a username John Doe, log in to the user interface 200, supply an email address and choose to be messaged every time a new notice was posted to the Internet notice posting system 108. In various other embodiments the end-user could select to be notified only when notices relevant to specific counties or jurisdictions are posted to the Internet notice posting system 108. In certain embodiments a user may also enter in a telephone number which would allow the Internet notice posting system 108 to send a SMS or MMS message to the phone when a notice of interest is posted. Further, the end-user may be able to enter in billing information which will enable to the Internet notice posting system 108 to produce invoices for notice services performed.

The user interface 200 may allow an end user to create a notice. In various embodiments the end user creates a notice by traversing several user interface screens that allow the end user to enter in specific information including state selection 208, county selection 210, notice type selection 212, other notice data entry 214 and validation 216. The information may be entered utilizing various form fields and dropdowns present on the user interface. Further, the user interface may provide different form fields to the end-user based on the state selection 208, county selection 210 and notice type selection 212. In the case of legal notice, the Internet posting service 108 user interface 200 will provide the form fields statutorily defined for that type of notice in that jurisdiction. The user interface 200 may then allow the end user to submit the notice to the Internet notice posting system's 108 notice application server 110 for processing by the PVS and NVS. Upon successful processing by the PVS and NVS the user interface may signal the end-user that the notice was successfully submitted. In other embodiments, the submission process will not perform the PVS before moving to the NVS.

The PVS, according to various embodiments validates information submitted to the Internet notice posting system 108. The PVS may be run on the notice application server 112 and may be coded in a variety of programming languages including Java, C#, C++, C, php, .NET and others. The PVS is able to take information submitted via the Internet notice posting system 108 user interface 200 or the IVR and validate it to ensure the completeness and correctness of information. In various embodiments, the PVS will compare information submitted through the user interface 200 to a validation scheme stored in the notice database 114 for the user selected jurisdiction. For example, an end user may select North Carolina, Guilford County and Notice of Foreclosure as the notice type via the user interface 200. The PVS will take this information and compare it to a set of fields in the notice database 114. For instance, the PVS will compare North Carolina with a list of all states. If the notice database 114 does not contain the information and the comparison fails the PVS validation will fail. Additional information relating to the Notice of Foreclosure, as used in our example, such as original deed of trust information, sale location, sale time, sale date, property information, deposit requirements and sale trustee information may be validated by the PVS by first parsing the data into component parts and then evaluating them individually. In various embodiments, parsing is provided by a slot grammar parser and the resulting component parts are validated against a list of acceptable terms for that data field stored in the notice database 114. Each part may be evaluated individually as well as in relation to the entire field entry against a database of acceptable terms and grammatical rules. In addition, each evaluation may further be given a validity score ranging from 1 to 100. In this situation, should the average score of each evaluation exceed a tolerance, the field will pass evaluation, otherwise the validation will fail. For example, utilizing the North Carolina, Guilford County and Notice of Foreclosure selections, values submitted in the sale time field may be validated as a correct date. Thus, a sale time of "10:00 a.m" may be parsed and validated as having acceptable values in that field with a score for "10:00" of 97 and a score for "a.m" of 93. While a sale time of "quail roost road" would be parsed and then flagged by the PVS as invalid with "quail" having a score of 30, "roost" having a score of 25 and "road" having a score of 12 for that field where the tolerance is set at 75.

In addition to the comparison of data types, the PVS may utilize information from various external databases and external applications for validation. For example, the PVS may connect to an external web service provided by the US Postal Office to analyze and verify that the property information submitted by the end user is a valid address. Thus, the PVS may query the US Postal Office web service for "1122 Quail Roost Drive, Greensboro, N.C., 27410" for indication that this is a valid address. Similarly the PVS may utilize web services to the Register of Deeds and other databases to validate submitted information. For instance, the PVS may query the Register of Deeds database to determine whether the information submitted relating to the original deed of trust is correct based on the submitted address. In another embodiment, the PVS will contact the clerk of courts database through a web service or a persistent connection and validate values of each field against the Clerk of Courts system. The PVS may, in other embodiments, utilize local copies of record databases for validation.

The PVS may, in various embodiments, adjust its ranking system over time. In these embodiments, every comparison of data and score ranking is logged for further evaluation when the information fails to meet the determined threshold. Thus, if the PVS flags a piece of data as invalid and upon later review it is found to be valid, the acceptable terms and grammar rules will be updated to reflect the validity. In this way, the PVS dynamically adapts to rule and vocabulary changes over time, thus maintaining a high degree of accuracy in validation.

The NFS, according to various embodiments, formats information submitted to the Internet notice posting system 108 into a valid format for providing notice. The NFS may be run on the notice application server 112 and may be coded in a variety of programming languages including Java, C#, C++, C, php, .NET and others. The NFS is able to take information validated by the PVS and populate it into the corresponding notice template. In various embodiments the notice templates are created utilizing HTML and CSS. The Internet notice posting system 108 and user interface 200 may then present the completed notice including end-user submitted data to the end-user for validation. Upon end-user validation, the NFS will transform the populated notice template into a non-editable format. The formats available include a PDF, or image such as TIFF. Conversion to PDF may be completed utilizing conversion programs such as Apache XML Graphics, html2 ps, dompdf, html-to-pdf or the like. Conversion into various image formats may be performed by utilizers such as Imagemagick®, GD2, HTML snapshot or others. Then the NFS will apply a cryptographic algorithm such as SHA or MD5 to the converted PDF or image file and store the resulting file in the notice database 114. The converted template may also be stored in the database for retrieval by users of the Internet notice posting system 108. In this way, the NFS provides the ability to verify the validity of a converted notice by reapplying the cryptographic algorithm and validating the result against the corresponding file stored in the notice database 114. If the two files are not the same, then the converted notice has been modified. These validation procedures may be performed later by end-users who view the notice or by and automated process that periodically verifies the validity of the converted notices stored in the notice database 114.

Figure 5:
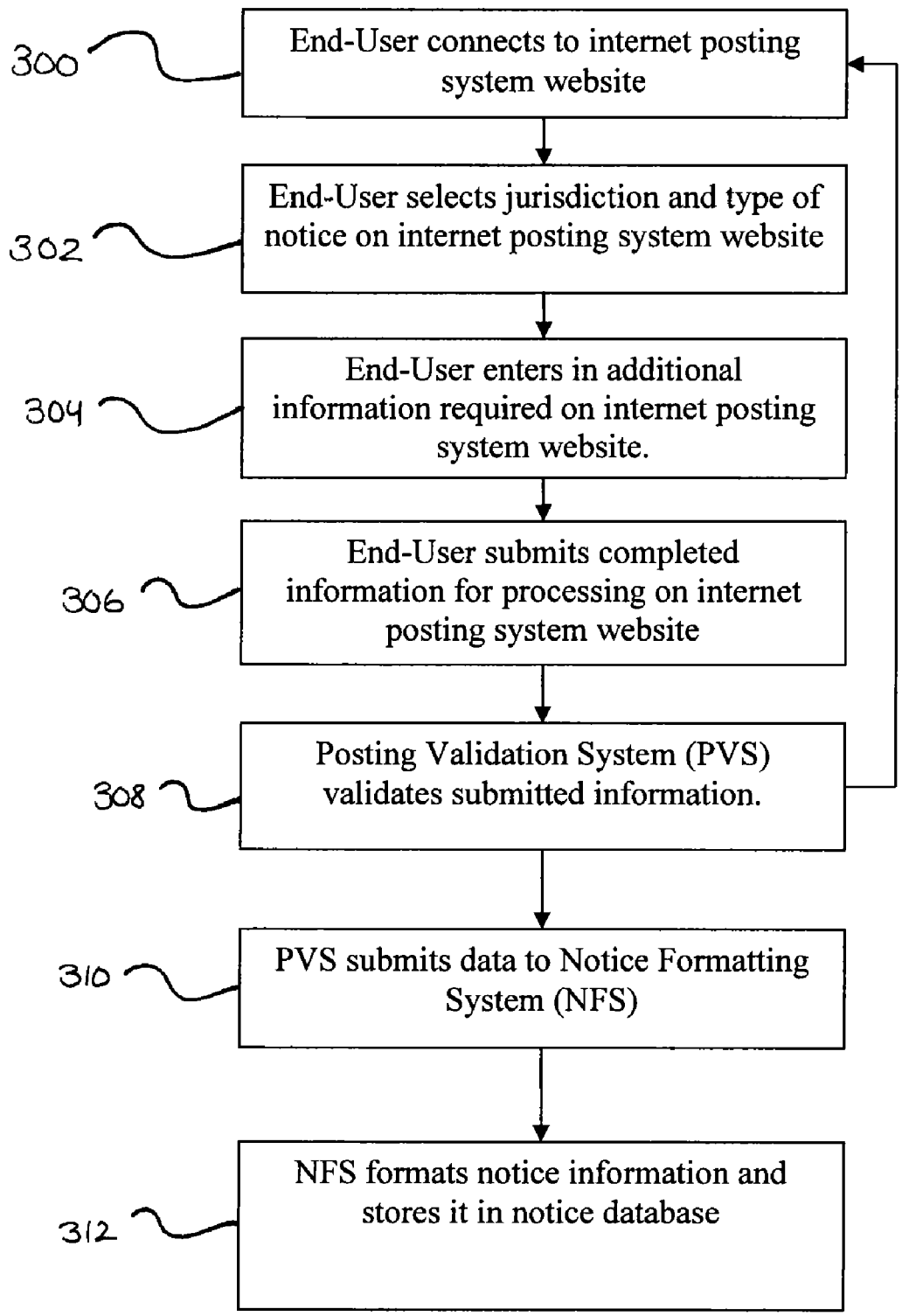
FIG. 5 is a flow chart representing the process of a user creating a notice according to one embodiment.

Now referring to FIG. 5 posting a notice to the Internet notice posting system 108 utilizing the Internet user interface according to one embodiment is presented. In this embodiment an end-user will utilize their Internet browser to connect to the Internet notice posting system's website 300. The end-user may utilize web browsers such as Microsoft Internet Explorer, Mozilla Firefox, Opera or Apple Safari. The end-user will then select the jurisdiction and the type of notice that they would like to submit 302. The end user then will enter in the additional information required by the selected notice in the selected jurisdiction on the Internet notice posting system website 304. Once the end-user has completed the data entry, they will submit the data 306 and the information is passed to the PVS 118. The PVS 118 then attempts to validate the information 308 utilizing the machines, systems, and methods presented above. If the PVS 118 determines that the information is invalid it will log the error and return to the Internet notice posting system website 300 and allow the end-user to reenter the information. If the PVS 118 determines that the information is valid, it will submit the information 310 to the NFS 116. The NFS 116 will format the notice and produce a converted notice file and cryptographic file which will then be stored in the notice database 312.

Figure 6:
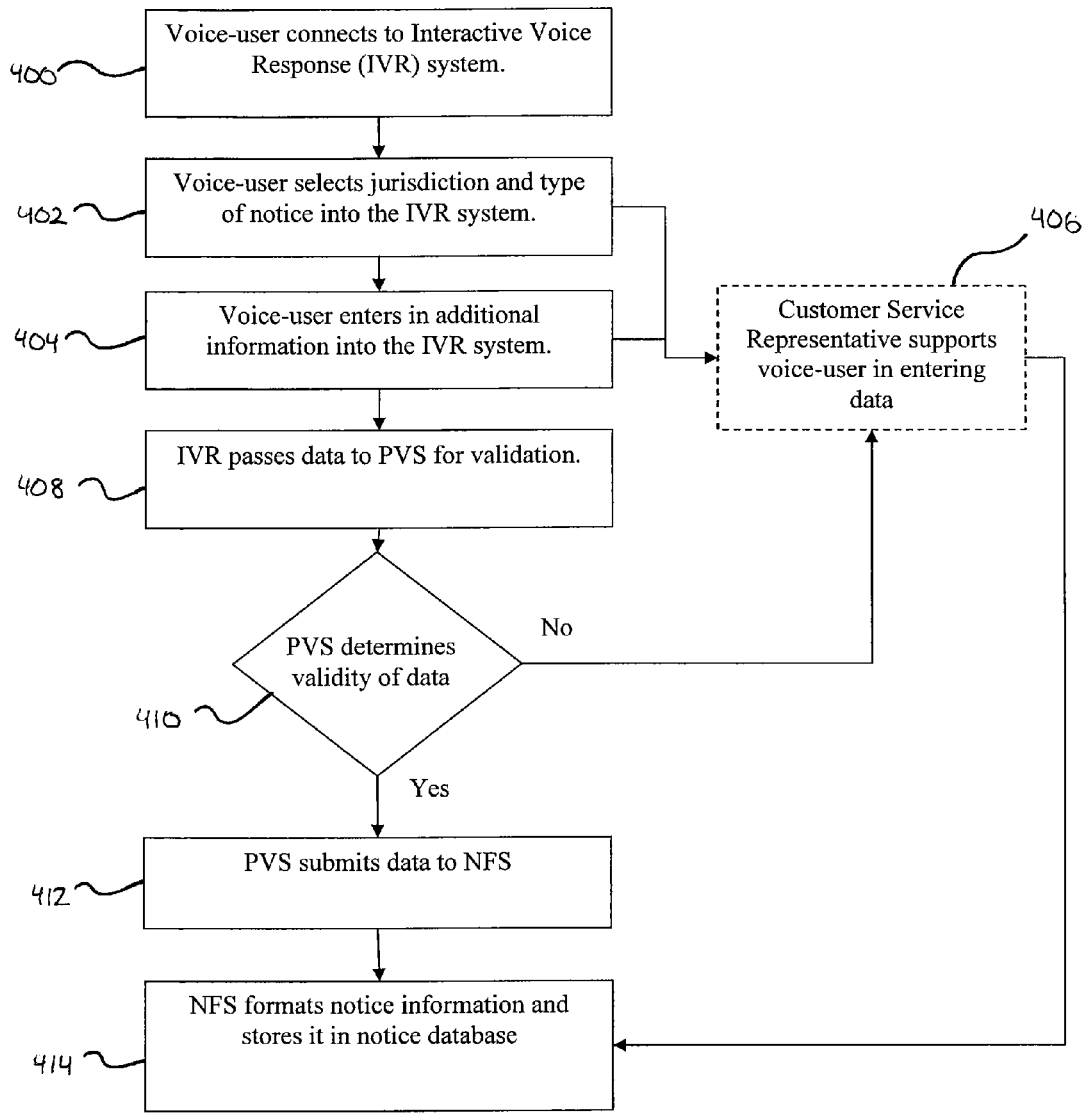
FIG. 6 is a flow chart representing the process of a voice user creating a notice according to one embodiment.

Now referring to FIG. 6 posting a notice to the Internet notice posting system 108 utilizing the IVR according to one embodiment is presented. In this embodiment, a voice user 124 will utilize their voice device to connect to the Internet notice posting system's IVR system 400. The voice user 124 may utilize a landline telephone, a cellphone, IP-voice service or other voice device. The voice user 124 will then select the jurisdiction 402 and type of notice that they would like to submit and enter in the additional information 404 required by the selected notice in the selected jurisdiction into the IVR 122. As mentioned earlier, this information may be submitted via voice recognition or keypad recognition in the IVR 122. At any time during the data entry, the voice user 120 may obtain support 406 from a customer service representative 128. The customer service representative may be requested for support, or may be initialized by the IVR, PVS or NFS. Once the voice user 120 has completed data entry the IVR 122 will forward the data to the PVS 118 for validation 408. The PVS 118 will attempt to validate the information 410 utilizing machines, systems, and methods presented above. If the PVS 118 determines that the information is invalid it will log the error and contact a customer service representative 128 who will assist the voice user 124 in data entry. If the PVS 118 determines that the information is valid, it will submit the information 412 to the NFS 116. The NFS 116 will format the notice and produce a converted notice file and cryptographic file which will then be stored 414 in the notice database 114. The customer service representative 128 may, in some cases, format the notice with information provided by the voice user 124 and store it directly in the notice database 114.

Figure 7:
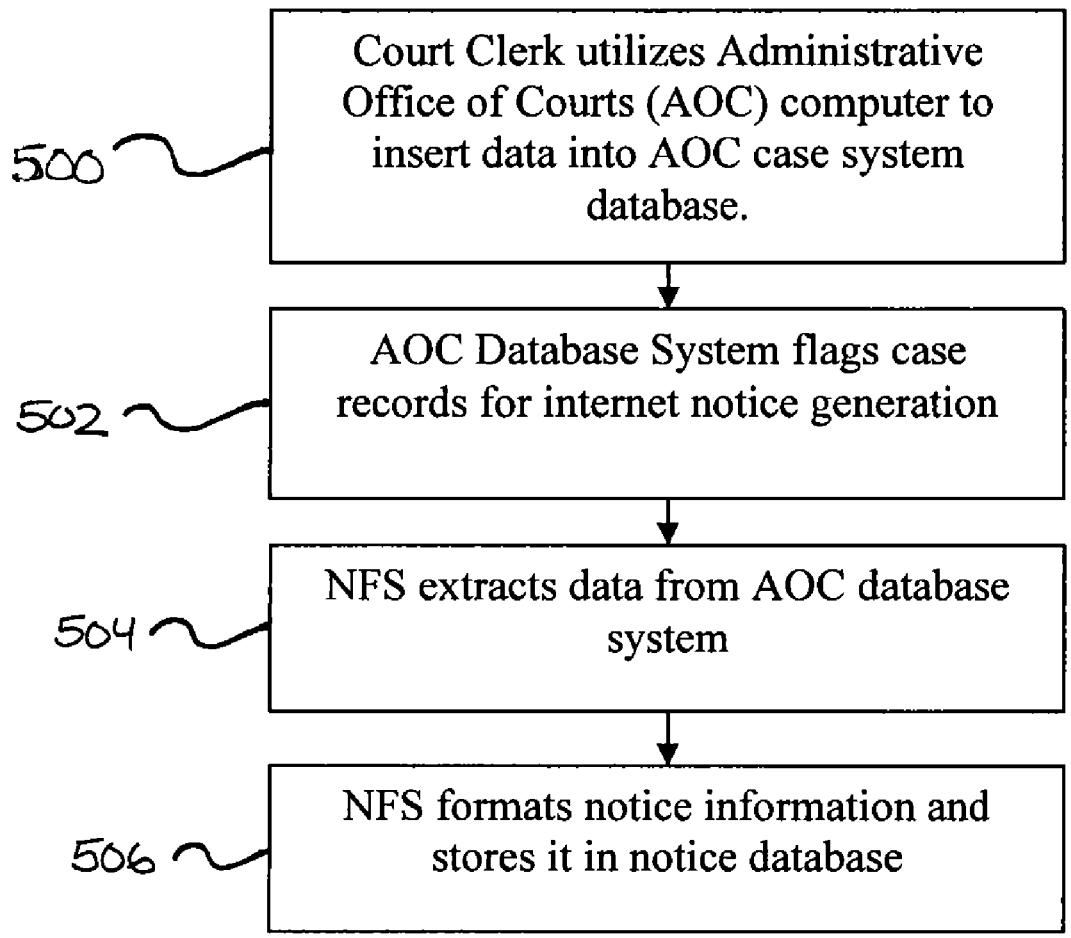
FIG. 7 is a flow chart representing the process of a court user creating a notice according to one embodiment.

Now referring to FIG. 7, posting a notice to the Internet notice posting system 108 utilizing the Internet notice posting system AOC connection, according to one embodiment is presented. In this embodiment, a court clerk or other state employee utilizing an AOC client computer 106 will enter in case data 500 into the court's enterprise server 102 and case database system 104. The court's case database system 104 may include an Internet notice posting component that flags 502 the case records selected for Internet notice generation. The NFS 116 may then extract notice data 504 from the case database system 104 based on the flags. In various embodiments, the NFS 116 may include a notice data extraction system that extracts the notice information from the case database system 104 utilizing an AOC connection. In other embodiments the notice data extraction system may be a process running within the Internet notice posting service 108 that periodically establishes a connection to the case database system 104 to look for data flagged for extraction by the case database system 104 or AOC client computer 106. In still other embodiments the notice data extraction system may be an application installed on the case database system 104 or AOC client computer 106 to extract data selected for notice generation while it is being entered or after a completed case database system 104 transaction. Thus, various embodiments, the extracted data is utilized by the NFS 116. The NFS 116 will format the notice and produce a converted notice file and cryptographic file which will then be stored 506 in the notice database 114.

Figure 8:
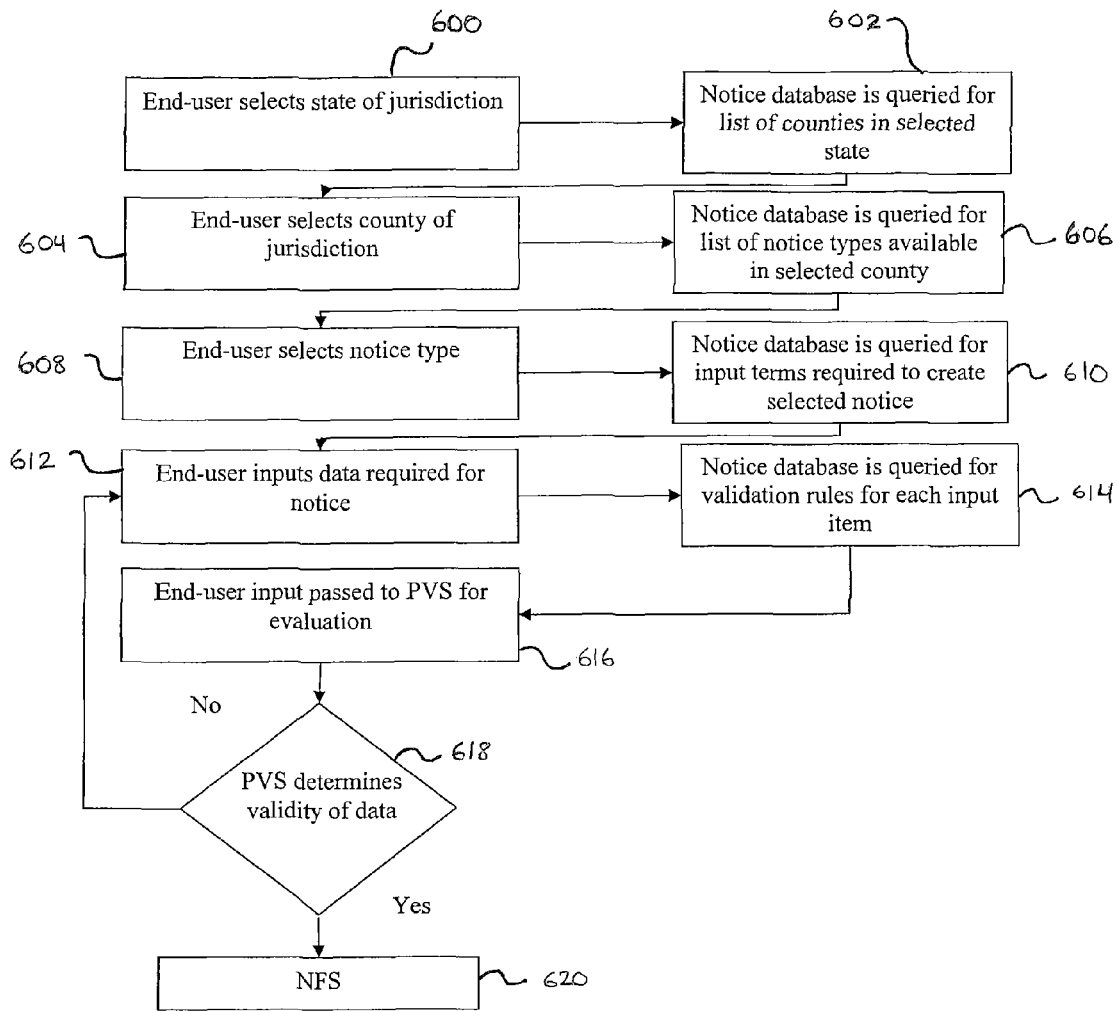
FIG. 8 is a flow chart of the posting validation system according to one embodiment.

Now referring to FIG. 8, a notice creation process, according to an embodiment, is presented. The process described in FIG. 8 may be utilized in various data entry endpoints including the Internet user interface and IVS systems presented above. The notice creation process begins with an end-user selecting a state of jurisdiction 600. The Internet notice posting system 108 will query the notice database 114 for a list of counties based on the selected state 602. The end-user will then select the county of interest from the list 604. The Internet notice posting system 108 will then query the notice database 114 for a list of notices available for the user-selected county 606. The end-user will then select the type of notice they are interested in posting 608. The Internet notice posting system 108 will then query the notice database 114 for a list of information input items required 610 to create the notice. The end-user will then enter in the data required to create the notice 612. The Internet notice posting system 108 will then query the notice database 114 for a list of validation rules for the various input items 614 and pass the data and the validation rules to the PVS for evaluation 616. The PVS with attempt to determine the validity of the input data 618 and if the data is not valid it will prompt the user to reenter the data required to create the notice 612. If the PVS determines that the data is valid then it will pass the data to the NFS for formatting 620. In various embodiments, the querying of a list of validation rules 614 will take place during PVS evaluation 616.

Figure 9:
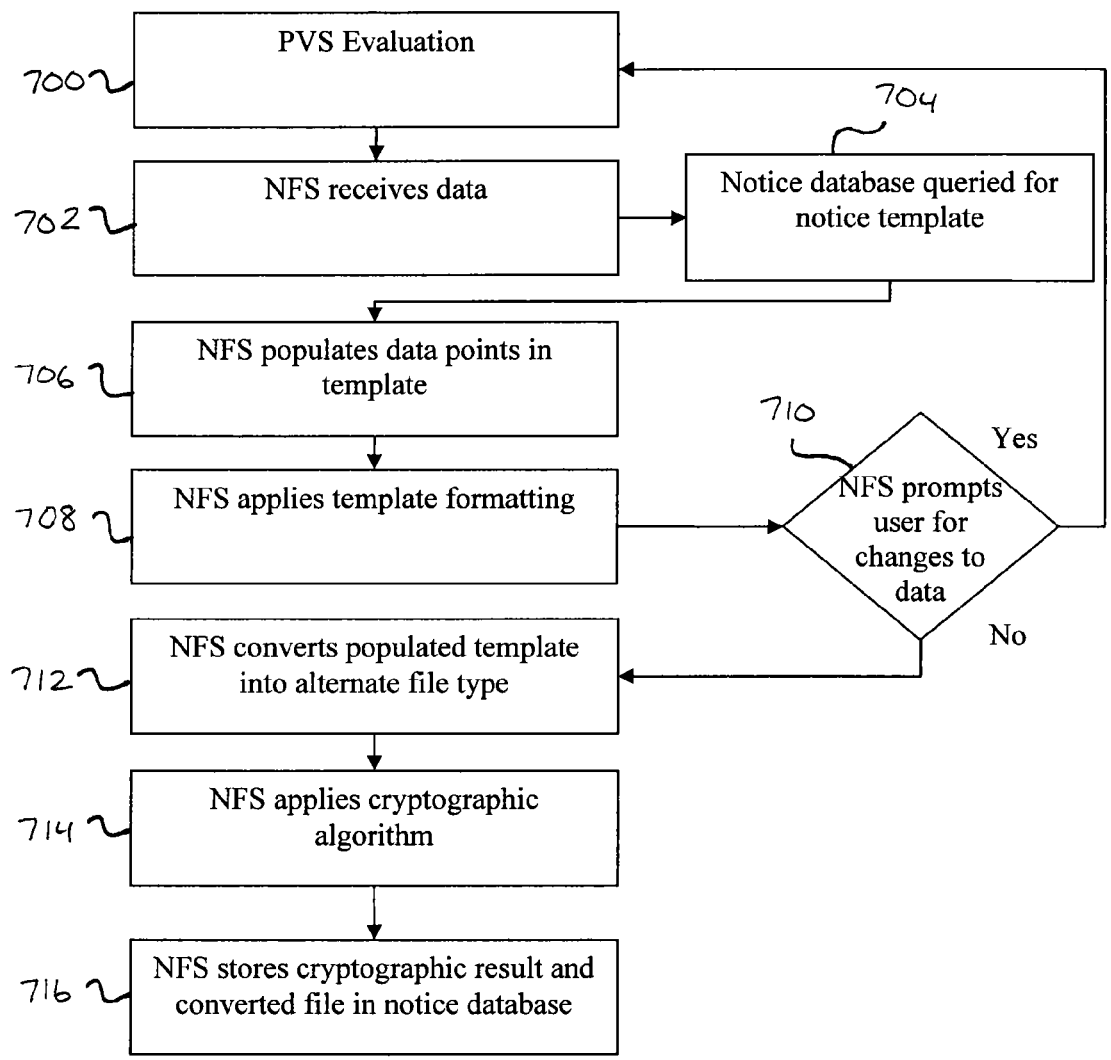
FIG. 9 is a flow chart of the notice formatting system according to one embodiment.

Now referring to FIG. 9, a notice formatting process, according to an embodiment, is presented. The process described in FIG. 9 may be utilized in various data entry endpoints including the Internet user interface and IVS systems presented above. The notice formatting process begins with the PVS validating the entered information 700. If valid, the PVS will forward the data to the NFS 702. At this point the NFS will query the notice database for the selected notice template based on the submitted data 704. Once the template is found, the NFS will populate the data points in the template 706. Further, the NFS will apply the template formatting to the completed template file 708. If the NFS was triggered by an Internet user interface user the notice will be formatted and displayed on the user interface. If the NFS was triggered by an IVS user then the NFS may validate input by providing a custom URL for a user to examine the notice over the Internet or it may utilize the IVS to recite the data entries back to the user over the voice system. The NFS may then prompt the user to determine whether there are any changes to the data required 710. If yes, the process will terminate and the Internet notice formatting system 108 will prompt the user to enter additional or corrected information for validation by the PVS 700. If there are no changes, then the NFS will convert the completed notice into an alternate file type 712. The file type may be an image such as TIFF, JPG, PNG, GIF or alternate format such as PDF. The NFS will then apply a cryptographic algorithm 714 such as SHA or MD5 to the converted PDF or image file and store the resulting file in the notice database along with the converted notice 716.

In various embodiments, the Internet notice posting system 108 provides several alternatives in generating revenue. In various embodiments the user interface may provide a payment remission screen before processing by the NVS to collect fees from the end user. In other embodiments, processing fees are billed to an identified end-user account. Further collection of revenue may be administered through the Clerk of Court of the respective courthouse, through the AOC main office in a respective state capital, or through a third-party. Various embodiments will utilize the AOC civil index postings to determine costs. In these embodiments, the costs of posting notice will be added to the court transaction fees, which will be transferred to the Internet notice posting system 108 on a recurring schedule. Further, in some embodiments, simply counting the number of postings as they are posted on the notice application server by a given source (individual, state or other jurisdiction) an overall number may be simply determined for billing purposes. In other embodiments, the Internet notice posting system 108 may increase revenue by providing additional services such as providing certified hard copies of notices and mailing notices to identified parties. In these embodiments the Internet notice posting system 108 will provide the Internet end-user or voice user with additional menu options to enable these services.

In another embodiment, the present invention provides methods and systems of using Internet notice posting as a way of supplanting other types of non-public legal notice. For example, corporations may be required to provide their email addresses and website information when incorporating with their respective Secretary of State. The posting of business notices may be accomplished using similar methods and systems for posting public notices, as described above.

Other embodiments of the invention include methods of posting a legal or other public notice on the Internet, serving as a registered agent for service of process for corporations, searching the Internet for such notices, and collecting revenues from users and sharing the revenue with administrative or government bodies.

Although the present invention has been described with respect to the various embodiments, it will be understood that numerous changes in configuration, arrangement or appearance of the elements of the present invention can be made without departing from the intended scope of the present invention.

What is claimed is:

1. A computer-implemented method for creating a public notice, the method comprising:
    providing an application server communicatively coupled to a network interface and a database server, the database server including a memory storing a public records database having a plurality of public notice database records;
    receiving jurisdiction data and notice-type data at the application server;
    providing a jurisdiction-specific form field to a user, the jurisdiction-specific form field determined by the received jurisdiction-data and the received notice-type data;
    receiving notice-information data at the application server, the notice-information data submitted by the user using the provided jurisdiction-specific form fields and including data from a data record flagged by an administrator of a court as requiring publication of a public notice and relating to data records of legal cases administered by the court and stored in a memory device of an administrative server, the received notice-information data, jurisdiction data, and notice-type data comprising a user-submitted notice;
    validating the user-submitted notice received at the application server, including:
        selecting a predetermined jurisdiction-specific notice format based upon the jurisdiction data received at the application server, the jurisdiction-specific notice format including a set of data fields,
        parsing the user-submitted notice into a plurality of individual component data parts,
        comparing each of the plurality of individual component data parts to a corresponding data field of the jurisdiction-specific notice format, and
        determining whether the user-submitted notice meets or exceeds a predetermined validation threshold;
    transforming the user-submitted notice into a public notice database record if the user-submitted notice meets or exceeds a predetermined validation threshold;
    storing the public notice database record in the memory storing the public records database; and
    wherein the public notice database record represents a public notice.

2. The method of claim 1, wherein receiving jurisdiction data and notice-type data at the application server comprises receiving jurisdiction data and notice-type data from a client computer coupled to the network interface.

3. The method of claim 1, wherein receiving notice-information data at the application server comprises receiving notice-information data from an administrative office of the courts (AOC) server.

4. The method of claim 1, wherein receiving notice-information data at the application server comprises receiving notice-information data from an interactive voice response server.

5. The method of claim 1, further comprising presenting a user interface to a user inputting the notice data, the user interface adapted to facilitate user registration and login, notice data input, and public notice confirmation.

6. The method of claim 1, further comprising making the public notice database record available to users of a wide area network.

7. The method of claim 1, wherein validating the user-submitted notice comprises comparing portions of the user-submitted notice to data provided by one or more external resources.

8. The method of claim 7, wherein the one or more external resources comprises an Internet-accessible database.

9. The method of claim 1, wherein validating the user-submitted notice further includes assigning a validity rank to the user-submitted notice and validating the user-submitted notice if the validity rank is greater than a predetermined threshold.

10. The method of claim 1, wherein transforming the user-submitted notice data into a public notice database record comprises:

populating a notice template with validated notice data to form a completed notice comprising a populated notice template requiring validation by an end user;

presenting the completed notice to the end user via a user interface;

requesting the end user to confirm the accuracy of the completed notice; and transforming the populated notice template into a non-editable format.

11. A system for creating a public notice that provides notice of legal information of a court, the system comprising:

a notice server including a memory device storing a notice database having public notice database records;

an administrative server including a memory device storing an administrative database having data records relating to legal cases administered by the court;

an administrative computer communicatively coupled to the administrative server over a first network and to the notice database over a second network, the administrative computer receiving data relating to the legal cases administered by the court as input from an operator of the administrative computer for transmission to the administrative server and subsequent formation of the data records;

and wherein the administrative server adds a data flag to at least one of the data records determined to require publication of a public notice, thereby creating at least one flagged data record, and the notice server receives the at least one flagged data record and creates a public notice database record comprising data of the at least one flagged data record based upon a predetermined, jurisdiction-specific public notice template, the creation of the public notice database record including:

receiving jurisdiction data and notice-type data at the application server;

providing a jurisdiction-specific form field to a user, the jurisdiction-specific form field determined by the jurisdiction data and the notice-type data;

receiving notice-information data at an application server, the notice-information data based upon the at least one flagged data record and submitted by the user using the provided jurisdiction-specific form fields, the received notice-information data, jurisdiction data, and notice-type data comprising a user-submitted notice;

validating the user-submitted notice received at the application server, including:

selecting a jurisdiction-specific notice format based upon the jurisdiction data received at the application server, the jurisdiction-specific notice format including a set of data fields, parsing the user-submitted notice into a plurality of individual component data parts, comparing each of the plurality of individual component data parts to a corresponding data field of the jurisdiction-specific notice format, and determining whether the user-submitted notice meets or exceeds a predetermined validation threshold;

transforming the user-submitted notice into a public notice database record if the user-submitted notice meets or exceeds the predetermined validation threshold;

storing the public notice database record in the memory storing the public records database; and wherein the public notice database record represents a public notice.

12. The system of claim 11, wherein the first network is a local area network.

13. The system of claim 11, wherein the second network is a wide-area network.

14. The system of claim 11, wherein the data records include records of court filings.

15. The system of claim 11, wherein the notice server validates the flagged data record.

16. A system for creating and posting a public notice, the system comprising:

a notice database server including a memory device for storing a notice database having notice database records; and a notice application server communicatively coupled to the notice database server and communicatively coupled to an enterprise server and a client computer of a user, the enterprise server storing an administrative database having data records relating to legal cases administered by a court, the client computer in communication with the enterprise server, and the notice application server adapted to create a public notice by executing the steps of:

receiving jurisdiction data and notice-type data from the enterprise server or the client computer at the notice application server;

providing a jurisdiction-specific form field to the client computer or the enterprise server, the jurisdiction-specific form field determined by the received jurisdiction-data and the received notice-type data;

receiving notice-information data at the notice application server, the notice-information data submitted by the client computer or the enterprise server, based upon the provided jurisdiction-specific form fields and including data from a data record flagged by the enterprise server as requiring publication of a public notice and relating to the legal cases administered by the court, the received notice-information data, jurisdiction data, and notice-type data comprising a submitted notice;

validating the submitted notice received at the notice application server, including:

selecting a predetermined jurisdiction-specific notice format based upon the jurisdiction data received at the application server, the jurisdiction-specific notice format including a set of data fields, parsing the user-submitted notice into a plurality of individual component data parts, comparing each of the plurality of individual component data parts to a corresponding data field of the jurisdiction-specific notice format, and determining whether the submitted notice meets or exceeds a predetermined validation threshold;

transforming the submitted notice into a public notice database record if the submitted notice meets or exceeds the predetermined validation threshold;

storing the public notice database record in the memory device; and wherein the public notice database record represents a public notice.

17. The system of claim 16, wherein the enterprise server is an administrative office of the courts (AOC) server.

18. The system of claim 16, wherein the notice application server is further adapted to post the public notice by communicatively coupling to the client computer over a wide-area network and presenting the notice database record through a notice-presenting user interface.

19. The system of claim 18, wherein the wide-area network is the Internet.

20. The system of claim 16, further comprising an interactive voice server communicatively coupled to the notice application server and adapted to receive voice input received over a voice communication line.

* * * * *

UNITED STATES PATENT AND TRADEMARK OFFICE
CERTIFICATE OF CORRECTION

| | |
|---|---|
| PATENT NO. | : 7,941,432 B2 |
| APPLICATION NO. | : 12/562768 |
| DATED | : May 10, 2011 |
| INVENTOR(S) | : Crispin Culbertson |

It is certified that error appears in the above-identified patent and that said Letters Patent is hereby corrected as shown below:

On the Title page, item (75) Inventor:

"K.E. Crispin Culbertson, Brown Summit, NC (US)"

should be:

Crispin Culbertson, Greensboro, NC (US)

Signed and Sealed this
First Day of October, 2013

Teresa Stanek Rea
*Deputy Director of the United States Patent and Trademark Office*